Patented Jan. 22, 1952

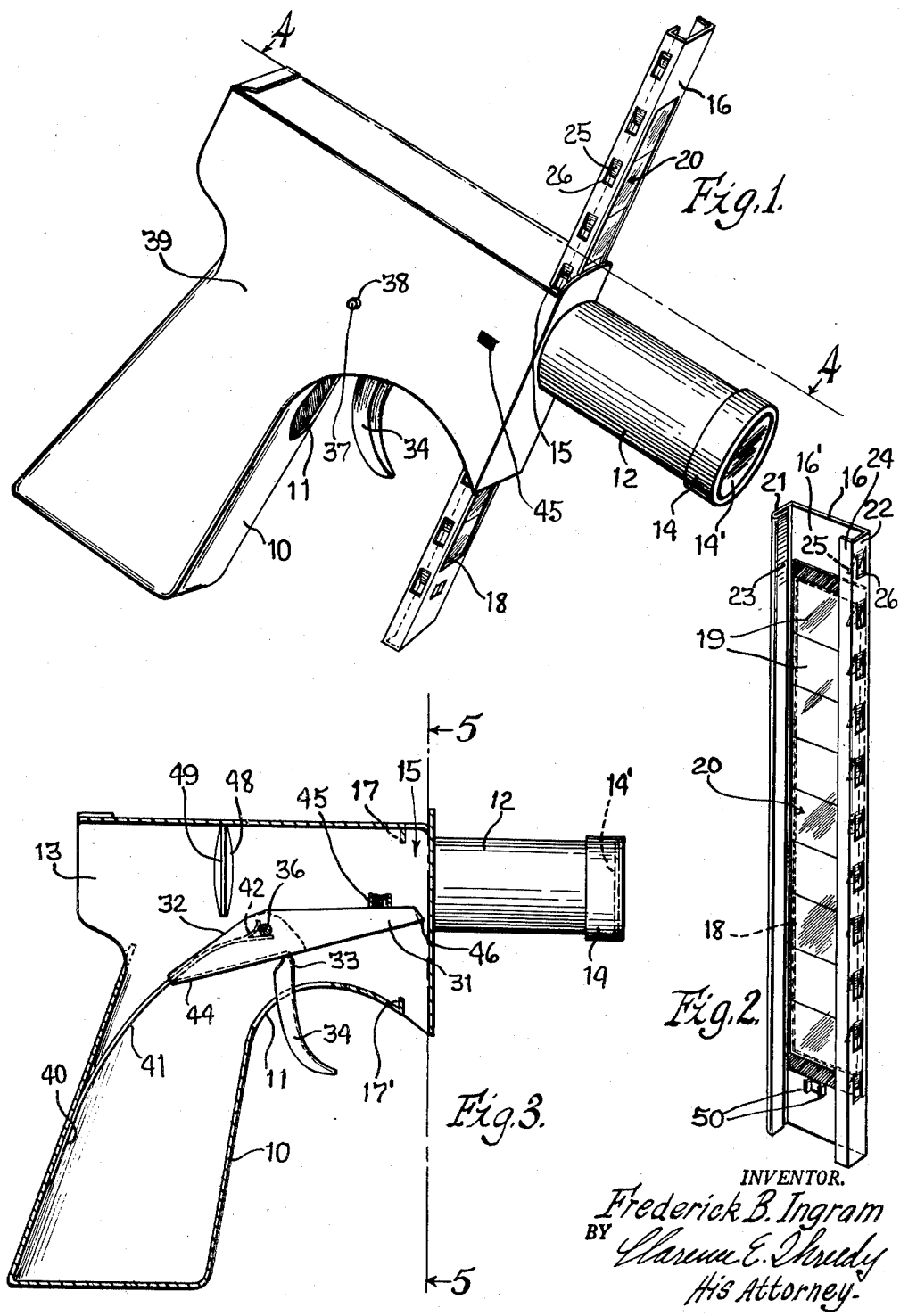

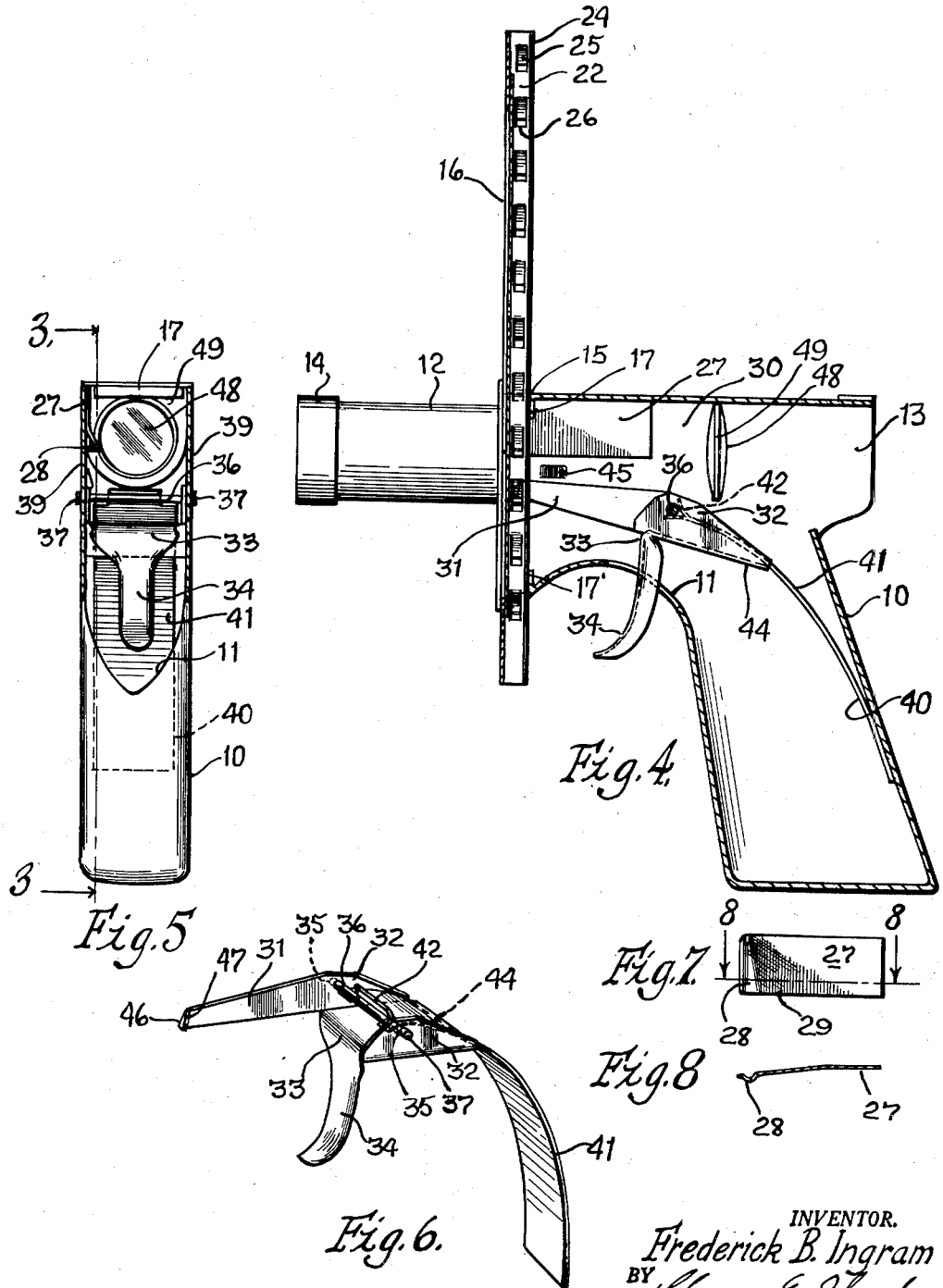

2,583,510

UNITED STATES PATENT OFFICE 2,583,510

PICTURE VIEWING DEVICE

Frederick B. Ingram, Moline, Ill.

Application June 14, 1948, Serial No. 32,773

3 Claims. (Cl. 40—28)

This invention relates to certain new and useful improvements in a picture viewing device. More particularly the invention relates to a picture viewing device designed for use with a strip of motion picture type film mounted in a frame for intermittent movement with the frame through the viewing barrel of a device formed to simulate a pistol.

The invention has for its principal object the provision of a construction of this character which will be highly efficient in use and economical in manufacture.

The foregoing device embodying this invention is intended primarily as a toy.

One of the objects of the invention is to construct such viewing device of as few parts as possible, thereby permitting the same to be manufactured and sold economically.

Another object of the invention is to provide in such device a film strip frame with a type of latching opening and latch which when the frame is intermittently moved, will produce a clicking sound so as to simulate the noise emitting from a pistol.

Another object of the invention is to provide in a viewing device an efficient and economical arrangement for intermittently moving the film carrying frame.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the invention;

Fig. 2 is a perspective view of the film carrying frame with a film mounted therein;

Fig. 3 is a sectional detail view taken substantially on line 3—3 of Fig. 5;

Fig. 4 is a sectional detail view taken substantially on line 4—4 of Fig. 1;

Fig. 5 is a sectional detail view taken substantially on line 5—5 of Fig. 3;

Fig. 6 is a perspective view of the film carrying frame moving mechanism;

Fig. 7 is a plan view of the frame latch; and

Fig. 8 is a sectional detail view taken substantially on line 8—8 of Fig. 7.

In the foregoing several views, I have shown my invention in the form of a toy pistol. This pistol comprises a hollow handle 10 having a trigger slot 11 formed therein. The pistol further includes a barrel 12 open at one end as at 13. The opposite end of the barrel carries a cap 14 in which is arranged a lens 14'.

The barrel and handle may be formed of any approved material and in any suitable manner to simulate a pistol.

Inwardly of the cap 14 is provided a vertical passage 15 for a frame 16, the body of the pistol providing guide flanges 17 to properly guide the frame 16 through the passage 15.

This frame 16 provides a front wall 16' having an elongated opening 18 formed therein for the exposure of a plurality of picture sections 19 of a film strip 20.

This frame 16 further provides opposite side flanges 21 and 22. The side flange 21 is turned inwardly upon itself to provide a retaining bar 23 for retaining the film strip 20 within the frame 16, it being pointed out that the width of the film strip is substantially the same as that of the frame so that when the film strip is mounted in the frame 16, the side edges of the film strip will frictionally engage the flanges 21 and 22 and will be removably held within the frame.

The flange 22 has an inturned portion 24 for reinforcing purposes. This flange 22 has struck therefrom, in spaced relation with respect to each other, portions 25 to provide openings 26 in spaced relation with respect to each other.

The frame 16 is removably retained in a predetermined position with respect to the barrel 12 by means of a latch flanger 27. This latch finger 27 is secured to the pistol body in any suitable manner, as for example, spot welding or the like. It comprises a flat elongated plate having an edge portion formed to provide a laterally extending rib 28 tapered in an upward and inward direction, as shown in Fig. 7. This plate has a portion 29 thereof flexed outwardly from the adjacent wall 30 of the pistol body. The tapered rib 28 is designed to successively engage in the openings 26 and, being of spring material, it is intended that the rib snap into these openings with a clicking effect so as to simulate the clicking operation of a gun trigger.

The means for intermittently moving the frame 16 comprises an arm 31 formed as an extension of one of two parallel wings 32 of a trigger structure 33 having a finger piece 34. These wings 32 have aligned perforations 35 formed therein through which project the end portions 37 of a pin 36. These end portions 37 are journalled in openings 38 formed in adjacent side walls 39 of the pistol body.

Arranged in the handle 10 and bearing against a wall thereof is one end portion 40 of a leaf spring 41. The opposite end portion of the leaf spring 41 is bifurcated as at 42, and into this bifurcated portion is seated the pin 36. The trigger structure 33 has an extended portion 44 which bears against the leaf spring 41 as shown in Figs. 3 and 4.

The arm 31 yieldably is retained in the position shown in Fig. 3 against a suitable stop 45 struck from an adjacent side wall of the pistol body. Pivotal movement of the arm 31 in picture moving direction against the action of the spring 41 is limited by the lower of the guide flanges 17 indicated at 17'. The end of this arm provides a laterally extending finger 46 tapered as at 47. This finger 46 is adapted to successively engage in the openings 26 to intermittently move the frame into the passage 15 upon each pivotal movement of the trigger structure. The tapered edge 47 of the arm 31 permits the finger 46 to freely move from engagement with an adjacent opening 26 upon pivotal movement of the trigger structure under the action of the spring 41.

Arranged in the barrel 12 in optical alignment with the lens bearing cap 14 and the open end 13 of the barrel 12, is a lens 48. This lens 48 is arranged in a frame 49 secured within the barrel in any suitable manner as by spot welding or the like.

As shown in Fig. 2, the frame 16 at its lower end portion provides a pair of limiting fingers 50. These fingers limit the positioning of the film strip 20 within the frame 16 so that the picture elements will be in proper alignment with the opening 18.

The openings 26 are formed in the flange 22 in a manner such that upon each complete pull of the trigger, a picture element 19 will be in optical alignment with the barrel 12.

As before stated, the picture viewing device is primarily intended as a toy, and it is intended that the pictures be of an educational or amusing character.

To view a picture after the frame has been properly mounted in the passage 15, the pistol is held with the index finger upon the trigger and with the open end of the barrel in optical alignment with the eye. By directing the barrel in the direction of a light, artificial or otherwise, the picture may be clearly viewed. Each time the trigger is manipulated, the frame 16 will be moved one step so as to present another picture for viewing through the barrel.

Each time that the frame is moved by the trigger, the latch finger 27 will effect a clicking sound so as to simulate the clicking of a hammer of a gun trigger.

The pistol body may be constructed in any suitable manner, such for example, by stamping, casting or the like.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A viewing device comprising a body formed to simulate a pistol and having an open end, and including a viewing barrel having lens opposite the open end of the body, and a handle to facilitate holding the pistol in optical alignment with the eye, the line of sight being through the body opening and the barrel lens, and a vertical passage extending transversely of the barrel between the lens thereof and the said opening, a picture bearing frame mounted for intermittent movement downward through the passage, trigger mechanism for intermittently moving said frame through said passage, said mechanism having a trigger adjacent and exterior the handle for engagement by a finger of a hand gripping said handle, and a latch means for yieldably latching the frame in predetermined position with respect to the barrel to hold a picture in position with respect to said barrel for viewing therethrough.

2. A viewing device comprising a body formed to simulate a pistol and having an open end and including a viewing barrel having lens located therein opposite the said open end of the body, and a vertical passage extending transversely of the barrel, a picture bearing frame mounted for intermittent movement downward through the passage, said passage having guiding flanges into which the picture frame is adapted to slide, means for intermittently moving said frame through said guiding flanges and said passage, and a combination latch and noise maker for said frame, comprising a latch plate having a flexed portion and a tapered rib, the latter adapted to snap into one of the several openings formed in the said frame when said frame is intermittently moved through said passage by said moving means.

3. A viewing device comprising a body formed to simulate a pistol and open at one end, including a barrel having a lens bearing cap opposite the open end of the body, and a handle to facilitate holding the pistol in optical alignment with the eye, said body providing a vertical passage extending transversely of the body, a picture bearing frame adapted for downward movement through said passage, said frame having inturned flanges with openings formed therein, said passage having guide flanges into which the said frame is adapted to slide, trigger mechanism carried by said handle and having means adapted to engage said frame for intermittently moving said frame through said passage, said last-named means including an arm having an inturned finger adapted to engage the said openings in the flanges of said frame, and a combination latch and noise maker for said frame comprising a latch plate having a flexed portion and a tapered rib, the latter adapted to snap into one of several openings of said frame when said frame is intermittently moved through said passage by said moving means.

FREDERICK B. INGRAM.

REFERENCES CITED

The following references are of record in the file of this patent:

UNITED STATES PATENTS

| Number | Name | Date |
| --- | --- | --- |
| 1,964,879 | Jelinck | July 3, 1934 |
| 2,029,415 | Dennis | Feb. 4, 1936 |
| 2,135,952 | Stephens | Nov. 8, 1938 |
| 2,276,735 | Miller | Mar. 17, 1942 |